United States Patent [19]

Mori

[11] Patent Number: 4,908,903
[45] Date of Patent: Mar. 20, 1990

[54] DEVICE FOR CLEANING A SPHERICAL DOME

[76] Inventor: Kei Mori, 3-16-3-501, Kaminoge, Setagaya-ku, Tokyo, Japan

[21] Appl. No.: 271,334

[22] Filed: Nov. 9, 1988

Related U.S. Application Data

[63] Continuation of Ser. No. 54,473, May 27, 1987, abandoned.

[30] Foreign Application Priority Data

Aug. 26, 1986 [JP] Japan ................................. 61-199736

[51] Int. Cl.$^4$ ............................................. A47L 25/00
[52] U.S. Cl. ................................... 15/250.04; 350/582
[58] Field of Search ........... 15/250 R, 250.01, 250.04, 15/250.03, 250 A, 250.2; 350/452, 582–587; 2/438

[56] References Cited

U.S. PATENT DOCUMENTS

| | | | |
|---|---|---|---|
| 3,599,269 | 8/1971 | Congdon | 15/250.04 |
| 3,704,481 | 12/1972 | Fennell | 15/250 A |
| 3,800,355 | 4/1974 | Lamprecht et al. | 15/250 A |
| 3,832,751 | 9/1974 | Ursel et al. | 15/250 A |

FOREIGN PATENT DOCUMENTS 2303662 1/1972 Sweden .......................... 15/250 A Primary Examiner—Harvey C. Hornsby
Assistant Examiner—Joseph S. Machuga
Attorney, Agent, or Firm—Jordan and Hamburg

[57] ABSTRACT

A cleaning device for cleaning the external surface of a spherical dome in which two transparent, almost semi-spherical bodies are joined with each other by the use of a flange mechanism to form an almost spherical dome and in which a solar ray collecting device is accommodated. The cleaning device comprises fixed members of a oneside-opened and hollow rectangular shape capable of being attachably and removably joined to a portion of the flange mechanism. The cleaning device further comprises a semi-circular wiper having fulcrums located on the fixed members along the diameter, the semi-spherical circle of the spherical dome can move so as to scan the semi-spherical surface thereof, a motor having a drive-shaft on the fulcrum for driving the wiper, a cleaning water passage having an ejection outlet on the inner circumferential surface of the wiper for ejecting pressurized cleaning water toward the spherical dome opposed thereto and a strain device for pressing said wiper onto the surface of the spherical dome with a constant pressure.

8 Claims, 2 Drawing Sheets

DEVICE FOR CLEANING A SPHERICAL DOME

BACKGROUND OF THE INVENTION

This application is a continuation of application Ser. No. 054,473, filed May 27, 1987.

The present invention relates to a device for cleaning the surface of a transparent spherical dome in which a lense system for collecting solar rays is accommodated.

A solar ray energy collecting and transmitting device previously proposed by the present applicant. In the device, the light-receiving end of an optical fiber is placed on the focal position of a Fresnel lense. Solar rays focused by the lense are guided into the optical fiber and transmitted there-through to an optional desired place where the solar rays are employed. Those plural lenses and optical fibers are united into one element as a light-ray focusing element to increase the total energy of the light rays.

A detecting sensor finds the position of the sun for the purpose of causing those Fresnel lenses to always be opposite to the sun. The detection signal, generated by the sensor, is transmitted to a control unit which controls the motion of a motor in order to adjust the angle of incidence in the south-north direction, and a point on the compass in an east-west direction is adjusted.

The main optical elements are accommodated in a spherical dome made of acrylic material or the like. The spherical dome consists of an upper semi-spherical dome and a lower semi-spherical dome. The respective domes are joined to each other by a joint flange having an almost semi-spherical shape at its circumference.

SUMMARY OF THE INVENTION

The object of the present invention is to provide a cleaning device for removing dust or dirt attached to the surface of the upper semi-spherical dome which covers the Fresnel lense for the purpose of more effectively collecting solar rays over a long period of time through the use of the solar ray collecting device.

BRIEF DESCRIPTION OF THE DRAWINGS

FIG. 2 is a construction view for explaining an embodiment of a spherical dome cleaning device according to the present invention, wherein

DESCRIPTION OF THE PREFERRED EMBODIMENTS

Figure 1:
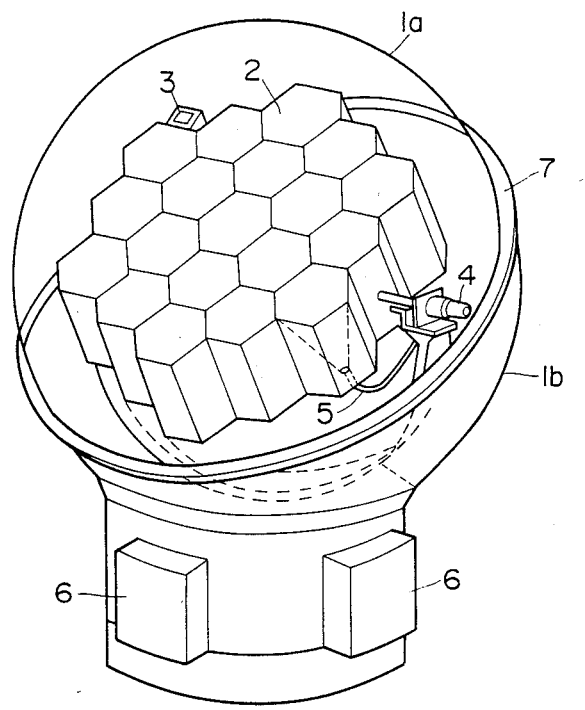
FIG. 1 is a perspective view showing a solar ray collecting device applicable to the present invention.

FIG. 1 shows a solar ray energy collecting and transmitting device previously proposed by the present applicant. In FIG. 1, the light-receiving end of an optical fiber 5 is placed on the focal position of a Fresnel lense 2. Solar rays focused by the lense 2 are guide into the optical fiber 5 and transmitted there-through to an optional desired place where the solar rays are employed. Those plural lenses and optical fibers are united into one element as a light-ray focusing element to increase the total energy of the light rays.

A detecting sensor 3 finds the position of the sun for the purpose of causing those Fresnel lenses 2 to always be opposite to the sun. The detection signal, generated by the sensor 3, is transmitted to a control unit 6 with controls the motion of a motor 4 in order to adjust the angle of incidence in the south-north direction, and a point on the compass in an east-west direction is adjusted by an apparatus not shown in FIG. 1.

The main optical elements are accommodated in a spherical dome made of acrylic material or the like. The spherical dome consists of an upper semi-spherical dome 1a and a lower semi-spherical dome 1b. The respective domes 1a and 1b are joined to each other by a joint flange 7 having an almost semi-spherical shape at its circumference.

Figure 2A:
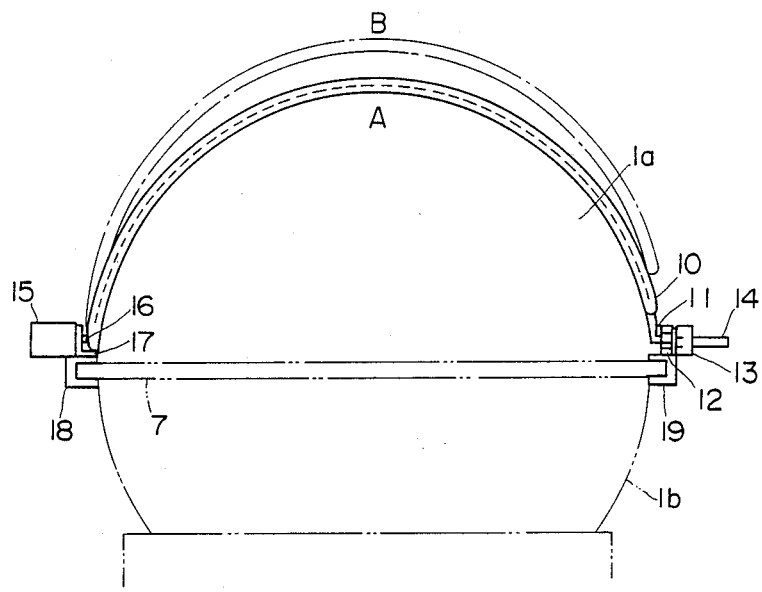
FIG. 2a is a side view of the same and FIG. 2b is a plane view thereof.
Figure 2B:
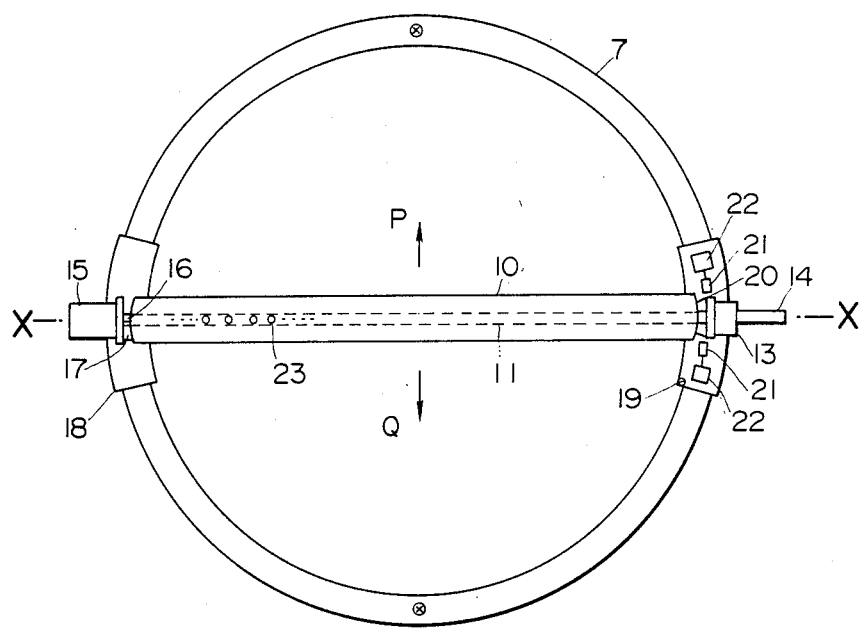

FIG. 2 is an outline explanatory view showing an embodiment of a cleaning device for cleaning a spherical dome according to the present invention, wherein FIG. 2a is a side view of the same and FIG. 2b is a plane view thereof. In FIG. 2, the internal mechanism of the solar ray collecting device, shown in FIG. 1, is omitted. A wiper 10 slides on the upper semi-spherical dome 1a by rotating around an axis line X—X in coincidence with the diameter of the joint flange 7.

The rotation is performed by a motor 15 fixedly mounted on a metal fixture 18 of a oneside-opened and hollow rectangular shape for holding the joint flange 7. The motor 15 is a DC speed reduction motor mounted on a motor mounting metal fixture 17 in the shape of the letter L and fixedly mounted on the metal fixture 18. The shaft 16 of the motor 15 is directly inserted into a joint metal fixture not shown in FIG. 2, fixedly mounted on the wiper 10, and joined thereto. On the other hand, wires 20 are stopped at 25 on both sides of the wiper 10 at the other end portion of the same. The wires 20 are also stopped on a strain device which is mounted on a metal fixture 19 for holding the joint flange 7 on the diameter of the joint flange 7. The strain device consists of a pair of pulleys 21 and a pair of winding out members 22 with a spring 22A installed therein. In such a construction, the tension of the wires 20 is maintained.

Figure 3:
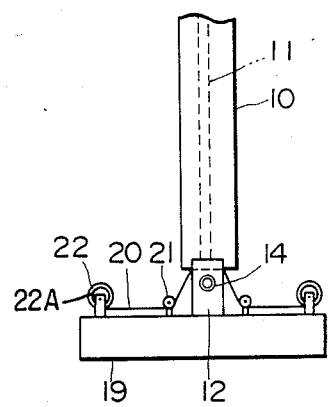
FIG. 3 is a detailed explanatory view of a strain device employed for the wiper of the present invention.
Figure 3:
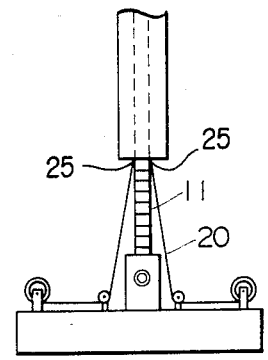

FIG. 3a shows the conditions for its employment. The wiper 10 is pushed with a constant pressure onto the upper semi-spherical dome 1a by the use of wires 20 which are kept taut. FIG. 3b shows the state of the wiper 10 while separated from the upper semi-spherical dome 1a.

A cleaning water passage 11 made of metal having a radius to be separated a little from the surface of the upper semi-spherical dome 1a is provided in the internal surface of the wiper 10 for the purpose of cleaning the surface of the same. An injection outlet 23 for ejecting cleaning water is bored on the cleaning water passage 11 so as to be opposed to the surface of the dome 1a, and pressurized cleaning liquid (water) is guided into the wiper 10 through an inlet 14 from a cleaning liquid (water) source not shown in FIGS. 2 and 3. And further, the cleaning water passage 11 is commonly used as a rotating shaft when rotatably driving the wiper 10, and the same pivotally supported on a bearing portion 12 and rotatably sealed by the use of a sealing mechanism 13. Furthermore, the wiper 10 is made of a soft material such as rubber, felt or the like, preventing damage to the surface of the dome 1a.

In such a construction as described above, when electric power is supplied to the motor 15 from a DC power source, not shown in FIG. 2, the wiper 10 cleans the dome with an even pressure. At this time, the wiper 10 moves on the surface of the dome in direction P or Q determined in accordance with the polarity of the electric current supplied to the motor 15, as shown in FIG. 2b. If necessary, pressurized cleaning liquid (water) is blown against the surface of the dome in order to remove dust or dirt therefrom. Furthermore, even though such dust or dirt enters the wiper 10, it can be easily removed by lifting the wiper 10 from position A to position B. Even then, the cleaning water passage 11 is in a fixed state.

As is apparent from the foregoing description, the surface of the dome is always kept clean by movably installing a dome-shaped cleaning device thereon according to the present invention. Consequently, energy loss can be prevented and thereby the cleaning device can be operated with maximum efficiency while the wiper is moving on the surface of the dome in directions P and Q. And further, the cleaning device, according to the present invention, is portable. When it is used, both of the metal fixtures 18 of the oneside-opened and hollow rectangular shape may be tightly fitted with the joint flange portion of the dome after increasing the distance between the metal fixtures 18 and by opening them by hand. Consequently, the work of combining the cleaning device with the dome and removing it therefrom can be simplified and the cleaning device can be easily operated.

I claim:

1. Apparatus for cleaning the external surface of a spherical dome of the type in which two substantially semispherical transparent bodies are joined to each other at a connecting flange to form a substantially spherical dome in which a solar ray collecting device is accommodated, comprising a pair of fixing means mounted on diametrically opposed portions of said flange, semi-circular wiper means, pivotal support means on each of said fixing means for pivotably supporting said wiper means for pivotal movement about a substantially diametric axis to effect a wiping action on one of said bodies, a motor means supported by one of said fixing means for pivoting said wiper means, cleaning fluid passage means in said wiper means for ejecting cleaning fluid onto said one body, and spring biased tensioning means connected to said wiper means and to the other of said fixing means for tensioning and biasingly urging said wiper means into biasing contact with said one body, said spring biased tensioning means comprising a wire attached to said wiper means, said spring biased tensioning means further comprising spring biased means mounted on the other of said fixing means and connected to said wire to maintain said wire in a taut condition such that said taut wire biasingly urges said wiper means into biasing contact with said one body.

2. Apparatus according to claim 1, wherein each of said fixing means has a groove for receiving said flange, each of said fixing means being detachably mounted on said flange.

3. Apparatus according to claim 1, wherein said spring biased means comprises spring biased winding-out means mounted on said other fixing means, said spring biased winding-out means comprising rotary wind-on elements on which portions of said wire are wound.

4. Apparatus according to claim 3, wherein said spring biased means comprises two of said spring biased windingout means each mounted on said other fixing means on opposite sides of said diametric axis.

5. Apparatus according to claim 4, wherein said spring biased means comprises pulleys mounted on said other fixing means about which said wire passes.

6. Apparatus according to claim 5, wherein said spring biased means comprises two of said pulleys each mounted on said other fixing means on opposite sides of said diametric axis.

7. Apparatus according to claim 2, wherein said wiper element has an inner wiper surface, said passage means being disposed in said wiper element radially outwardly of said inner wiping surface.

8. Apparatus according to claim 1, wherein said passage means further comprises a pivotal shaft mounted on said pivotal support means, at least a portion of said pivotal shaft having a hollow passage for said cleaning fluid.

* * * * *